A. KIMBER.
Car-Coupling.

No. 9,214. Reissued May 25, 1880.

WITNESSES;
G. H. Rennett,
Zelora Phillips

INVENTOR.
Abraham Kimber,
Per E. Frink,
his Attorney.

N. PETERS, PHOTO-LITHOGRAPHER, WASHINGTON, D. C.

UNITED STATES PATENT OFFICE.

ABRAHAM KIMBER, OF INDIANAPOLIS, INDIANA.

CAR-COUPLING.

SPECIFICATION forming part of Reissued Letters Patent No. 9,214, dated May 25, 1880.

Original No. 147,651, dated February 17, 1874. Application for reissue filed March 15, 1880.

*To all whom it may concern:*

Be it known that I, ABRAHAM KIMBER, of Indianapolis, in the county of Marion and State of Indiana, have invented a new and useful Improvement in Car-Couplings, of which the following is a specification.

My invention relates to railroad-car couplings of the self-coupling kind, in which a raised and peculiarly-constructed knob at the front upper side of the draw-head operates in conjunction with a link and a corresponding draw-bar.

The objects of my improvement are, first, to provide a device for holding a coupling-link on the draw-heads, and preventing the link from being displaced by reason of sudden jerks, jars, and wrenches incident to a train while in motion, and yet permit the link to become disconnected from the draw-bars in case one or more cars should turn over by reason of an accident; second, to afford facilities for holding the link elevated at one end while in the act of coupling cars, and releasing the elevated end when the draw-heads come together, thus permitting the elevated end of the link to fall into its place and effect the coupling; third, to afford facilities for supporting the link in a vertical position and retain the same on its draw-head when ordinary links and pins are employed for coupling the cars; fourth, to provide a means for holding the ends of the link down after a coupling is made; fifth, to provide a means for raising one or both ends of the link to effect its uncoupling; sixth, to provide a means for coupling cars together whether one car be higher or lower than the other; seventh, to provide a means of coupling and uncoupling cars without necessitating the entrance of an employé between the cars; eighth, to provide a means for the self-coupling of cars, or for the use of the ordinary link and pin; ninth, to provide a coupling that will relieve the downward pressure of the end of one car on the end of another car, usually caused by the difference in the height of the draw-heads, which frequently pinch the links.

These objects I attain by the mechanism illustrated in the accompanying drawings, in which—

Figure 1:
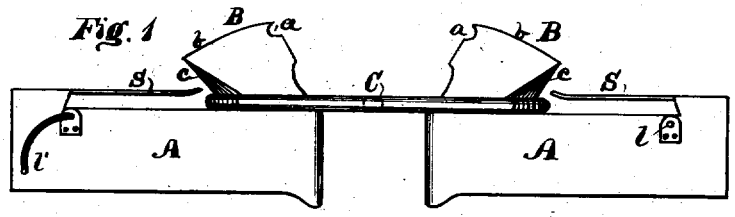
Figure 2:
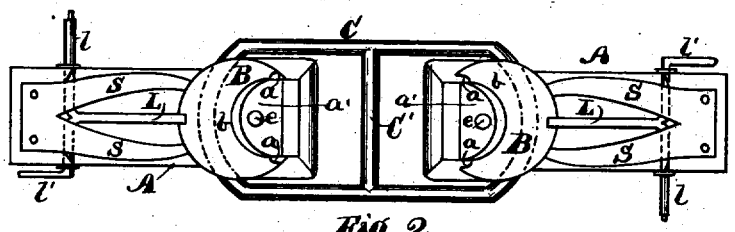
Figure 3:
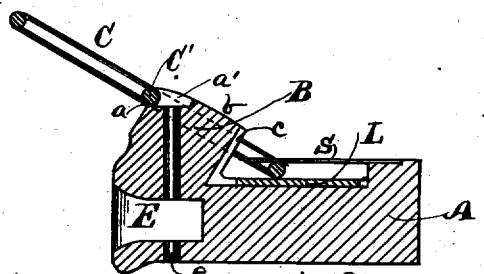

Figure 1 is a side elevation of two of my draw-heads united together by a link. Fig. 2 is a top or plan view of the same. Fig. 3 is a sectional view of one draw-head, showing the link elevated at one end preparatory to the act of coupling the cars; and Fig. 4 also is a section, same as that shown in Fig. 3, with the link displaced from its elevated support, as in the act of dropping down.

Like letters refer to like parts throughout the various views.

A A represent two draw-heads or draw-bars, each one being a duplicate of the other. The front or buffer end of each draw-head is provided with a link-chamber, E, and a pin-hole, *e*, in the ordinary manner. The upper side of the draw-head, near the front end, is provided with a crescent-shaped raised knob, B, the rear portion of which is curved laterally, and also inclined backward from its base to its top, as shown at *c*, to form a laterally-curved beveled recess at the base of the knob to receive and hold one end of the link C. Thus the rear end of each knob B forms a projection, the shape of the base of which conforms with the shape of the end of the link employed in coupling. The upper surface, *b*, of the knob B is laterally rounded and inclined downward from the notches *a* in front to the rear to guide the link to its place, and is hollowed out at the top, forming the recess *a'*. The metal which forms the side edges of this recess or the lateral sides of the crescent knob is cut away at the top, forming the notches *a a* at each side, which form a bearing for the cross-bar C' of the link C, and by means of which one end of said link is held up during the act of coupling cars, as shown in Fig. 3.

Figure 4:
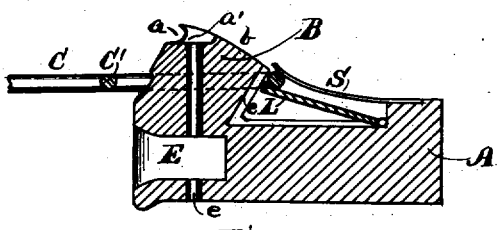

The upper surface of the draw-bar in the rear of the raised knob B is provided with a recess or hole, in which the movable arm L is pivoted by the transverse bar *l*, and operated by the lever or crank *l'* at the side of the draw-bar. The movable arm L extends forward nearly under the upper rearward projecting end of the knob B, but far enough back to permit the end of the arm to rise without striking the inclined part *c* of the knob. Over the arm L, and secured to the top of the draw-bar, is a bifurcated spring, S, which is arranged horizontally in the rear of the knob B, so that its free ends will be far enough from the under beveled surface of the knob B to permit the link C, when resting on the spring, and draft is applied to it, to bend the spring down and fall below it, and yet long enough to prevent the link from being removed from below it until the spring and link are raised by the arm L far enough to permit the link to slip out at the rear top edge of the knob B, as shown in Fig. 4.

The link C is oblong, with circular ends, and provided across its middle with the bar C′. This bar C′ is designed to rest in the notches *a a* of the knob B and support the link with one end elevated, as in Fig. 3.

The operation of my improved car-coupling is as follows: One end of the link C is adjusted over the knob B of one draw-head and the other end tilted up until the cross-bar C′ rests in the notches *a a*, as shown in Fig. 3. When in this position, if two duplicate draw-bars attached to different cars come together, as in the act of coupling, the concussion throws the link C forward until the lower inclined end of the link comes in contact with the under beveled rear side of the knob B. At the same time the bar C is displaced from its bearings in the notches *a a*, and the other or elevated end of the link drops over the knob B of the other duplicate draw-head and rests on the spring S, the upper edge of the link being below the upper edge of the under bevel *c*. When the cars move forward and take up slack the end of the link which rests on the spring is drawn forward, and the under bevel *c* causes it to be forced downward until the ends of the spring S are released and spring up, leaving the end of the link in its proper place behind the knob B, as shown in Figs. 1 and 2.

When it is desired to uncouple the cars, the lever or crank *l′* may be operated from the side of the car, (or from above by a suitable connecting-rod, not shown,) the crank is pressed down, (if in the position shown,) and the arm L is raised, carrying with it the link C and bending the spring S up until the link is above the upper beveled edge of the knob, where it is released and the cars unshackled.

In making a coupling with the ordinary link and pins, the links are inserted in the chambers E, and the pins in the holes *e*, all in the usual manner.

In case of an accident where one car turns over, the links C are twisted out from the recesses behind the knobs B, and thus disconnect the cars.

What I claim as my invention, and desire to secure by Letters Patent, is—

1. In a draw-bar, the head A, having a raised knob, B, on its upper side, the upper portion of which is provided with notches *a a*, as and for the purpose specified.

2. In a draw-bar, the head A, having a raised knob, B, on its upper side, provided with notches *a a*, and its rear under-beveled part *c*, forming a laterally-curved beveled recess at its base to receive and hold the link, substantially as described.

3. In a draw-bar, the head A, having a raised knob, B, and laterally-curved beveled recess at the rear of its base, said knob also having a recess, *a′*, in its upper surface, with a pin-hole, *e*, in its center, and notches *a a* in the upper edges of the metal that forms the side walls of the recess *a′*, substantially as described, for the purpose specified.

4. In combination with the notches *a a* in the upper part of the knob B, the cross-bar C′ of the link C, substantially as described, for the purpose specified.

5. The draw-head A, having the knob B on its upper side, with laterally-curved beveled recess at the rear of its base, combined with the spring S and link C, substantially as specified.

6. The draw-head A, having the knob B on its upper side, with laterally-curved beveled recess at the rear of its base, combined with the lifting-arm L and spring S, substantially as described.

In testimony whereof I have signed my name to this specification in the presence of two subscribing witnesses.

ABRAHAM KIMBER.

Witnesses:

G. H. RENNETT,

ZELORD PHILLIPS.